United States Patent [19]

Zehner

[11] Patent Number: 5,532,974
[45] Date of Patent: Jul. 2, 1996

[54] BEAM PATTERN MEASURING APPARATUS FOR SIDE-SCANNING SONARS

[75] Inventor: William J. Zehner, Lynn Haven, Fla.

[73] Assignee: The United States of America as represented by the Secretary of the Navy, Washington, D.C.

[21] Appl. No.: 521,379

[22] Filed: Jun. 9, 1995

[51] Int. Cl.$^6$ ................................................. H04B 17/00
[52] U.S. Cl. ............................................. 367/013; 367/88
[58] Field of Search ....................................... 367/13, 88

[56] References Cited

U.S. PATENT DOCUMENTS

| | | | |
|---|---|---|---|
| 3,859,620 | 1/1975 | Percy | 367/13 |
| 4,320,468 | 3/1982 | Montross | 367/13 |
| 5,010,525 | 4/1991 | Skinner et al. | 367/13 |

Primary Examiner—Daniel T. Pihulic
Attorney, Agent, or Firm—Harvey A. Gilbert; William C. Townsend

[57] ABSTRACT

An apparatus for performing beam pattern measurements for a side-scanning sonar. The apparatus consists of a vertically mounted guide affixed to one end of a test pool and a vertically fixed mounting means affixed to the opposite end of the pool, the guide and mounting means orthogonal to each other. A carriage to which the transducer under test is attached is movably secured to travel up and down the guide. A gear motor having a takeup reel winds and unwinds an attached cable, the other end of which connects to the carriage, producing its up and town travel. The motor connects via a motor controller and position cable to a motor controller at a remote instrumentation facility. A position sensing device slaved to the carriage cable sends carriage position information to the facility for motor control. The array is secured immobile to the vertically fixed mounting means. The vertically fixed mounting means may be arranged to permit horizontal travel in the direction of the vertically mounted guide for range adjustment.

10 Claims, 2 Drawing Sheets

BEAM PATTERN MEASURING APPARATUS FOR SIDE-SCANNING SONARS

The present invention relates to pulsed-transmission, echo ranging sonars and, in particular, it relates to the measurement of beam pattern and complex acoustic response for side-scanning sonars.

BACKGROUND OF THE INVENTION

Side-Scanning Sonar Principles. Side-scanning sonars (SSS) are designed primarily to create visual images of the sea floor and any objects laying thereon. The image is created by scanning the area of interest with an acoustic beam. A short acoustic pulse, typically on the order of millisecond is launched from the projector array, and it travels away from the array at the sound propagation velocity of the medium, typically about 1500 m/s in sea water. The sea floor and any objects in the sound field reflect a portion of the sound back to the hydrophone array where it is sensed. The two-way travel time of the echoes provides a very accurate measure of the distance to the reflecting objects in a direction normal to the major axis of the acoustic array, called the cross-track direction. Scanning in the along-track direction is accomplished by physically moving the array while periodically emitting new acoustic pulses. The result is a two-dimensional map of the reflecting objects in the scanned area. The echo amplitudes recorded are related to the size, shape, orientation, and acoustic impedance of the reflecting objects in each spatial location.

The shape of the transmitted acoustic field (i.e., the projector beam pattern) as well as the shape of the receiver array pattern (and more particularly, the shape of their intersection) must be controlled very carefully to produce accurate images. There is a significant number of different approaches to their design, but all have quite broad beams in the vertical plane (typically around 90 degrees centered at 45 degrees below the horizon), and quite narrow beams in the horizontal plane (because the latter defines the sonar resolution in a along-track direction). Especially in very high resolution arrays, it is necessary to measure and correct the inter-channel differences in amplitude and phase due either to hydrophone element placement inaccuracies or electronic mismatches.

In fact, most modern side-scanning sonars produce extremely narrow search beams, on the order of 0.1 degrees, in the along-track direction, and this creates extreme difficulties in the array measurement and calibration process. The hydrophone array itself is nearly always operated in the near field, or Fresnel zone, where range $\ll L^2/\lambda$, and where L is the total array length and $\lambda$ is the acoustic wavelength), which means it must be focused to produce useful beams. The depth of field is usually so short that the focal distance must be changed for different target distances. This is usually accomplished by subdividing the receiving array into a number of discrete transducer elements and electronically introducing a time delay or phase shift into the received signal that focuses the beam dynamically as the pulse travels. Additionally, side-scan sonars, unlike sector-scan sonars, must change their beam width as the pulse travels so as to maintain a constant along-track resolution at all ranges. This is usually accomplished by electronically changing the length of the hydrophone according to $$N_e = \frac{R\lambda}{d\Delta x}$$

where $N_e$ is the number of array element signals summed to form the beam, R is range to target, d is the element spacing, and $\Delta x$ is the desired along-track resolution. This also requires that the array be divided into discrete elements. In general, it is necessary to space the elements at one half wavelength intervals (the spatial equivalent of the Nyquist sampling theorem) in order to prevent spatial aliasing (i.e., grating lobes). However, it is also desirable to minimize the number of elements used because each one requires an analog receiver channel, and a typical array may be several hundred wavelengths long. Fortunately, because the SSS projector only irradiates a finite sector, it is permissible to use spacings much greater than a wavelength. In fact, the spacing is usually chosen as great as possible without allowing receiver array grating lobes into the projector's sound beam under worst case conditions, which turns out, surprisingly, to be at the minimum desired operating range.

The result is that each element is many wavelengths long and thus has a fairly narrow beam pattern itself. This presents the problem shown in FIG. 1. The preferred method of measuring the relative phase and amplitude response of each element is to place an acoustic source on a line passing through the center of the array at a distance sufficient that all the elements have the source point within their 3 dB field of view and use a single acoustic pulse for the measurement. The required separation distance is frequently quite large, on the order of a hundred meters, so that very few test facilities are of sufficient size to accommodate such tests and even fewer are equipped with appropriate positioning equipment. As an example, a two meter long array comprised of 30 wavelength elements requires a target distance of at least 57 m from the array, and positioning accuracy of a few centimeters in the along-track direction.

The receive array beam pattern is the spatial equivalent of the system impulse response: it is necessary and sufficient to completely specify the system transfer function and thus to allow performance predictions for any operating environment of interest. It is, therefore, of great importance to obtain a valid and accurate measurement of the pattern, and yet it is almost never done on SSS arrays because of the difficulty of the measurement.

Sector-Scanning Sonars. Historically, the majority of sonars have been sector-scanning. Unlike side-scanners that scan laterally by translational movement, sector-scanners scan in bearing by rotational movement. Conventional beam pattern measurement equipments were designed to provide rotational beam patterns for sector-scanning sonars by rotating the array of interest while receiving pulses from a calibrated projector at fairly short distances and recording the amplitude versus bearing angle. This is entirely appropriate for recording short range patterns of sector scan sonars, i.e., those producing constant angular resolution rather than constant along-track resolution, having modest resolution on the order of one or more degrees. If longer range patterns are required, the speed of rotation must be reduced to accommodate the longer inter-ping time. Rotators of conventional design tend to stall at slow speeds so that the sampling density in many cases becomes too low to produce useful patterns. For high resolution side-scanning sonars this process is not usable. Because the SSS beam pattern is electronically varied considerably with range, it is necessary to obtain pattern measurements at several different ranges, particularly at minimum and maximum design ranges. As an example, to measure the one-way receive pattern of a 0.1 degree sonar array at a range of 100 m, and to obtain a sampling density of at least 10 sample points in the main lobe to provide a smooth pattern requires a maximum rotation rate of 0.15 deg/s and accurately spaced sampling intervals of 0.02 degrees; well beyond the capability of conventional rotators and angle measuring equipment.

Other Prior Art. Only one alternate approach is known to have been used: a long (15 m) horizontal rail facility was built at the U.S. Navy Coastal Systems Station (CSS) in 1978 and attached to the old Hathaway Bridge in Saint Andrews Bay, Florida. This unit had the capability to translate, rather than rotate, a hydrophone array horizontally across a distance of about 12 meters. The translator was built to very exacting flatness and linearity specifications, and was an excellent appliance for the purpose of measuring SSS patterns. Unfortunately, it was very expensive and required a very elaborate mounting structure, and because the bridge has since been demolished, there is presently no way to deploy it. One disadvantage is that, because it used a horizontal translator, it also required a very bulky and complex mechanism to lower the entire rail and carriage system into the water for measurements and raise it to attach or remove the array under test.

SUMMARY OF THE INVENTION

It is thus an object of the present invention to provide an apparatus for obtaining accurate side-scanning sonar projector, receiver, and composite projector and receiver array beam pattern measurements.

It is yet another object of the present invention to provide an apparatus for obtaining accurate phase and amplitude measurements on the elements of side-scanning sonar receiver arrays.

It is another object of the present invention to provide an apparatus for producing vertical translation of an acoustic source in a side-scanning sonar rather than rotation or horizontal translation of the array.

It is still another object of the present invention to provide a new translator and carriage apparatus that has no inherent sag for obtaining accurate side-scanning sonar array beam pattern measurements.

It is further another object of the present invention to provide an apparatus for obtaining accurate side-scanning sonar array beam pattern measurements that requires only one moving positioning mechanism.

It is yet another object of the present invention to provide an apparatus for accurately and conveniently positioning a calibrated projector so that accurate phase and amplitude measurements can be made using a single acoustic transmission without a coherent, repeatable source signal, and without a stable transmission medium.

The present invention relates to pulsed-transmission, echo ranging sonar systems of the side-scanning variety. The invention employs a rigid vertically mounted guide, such as a rail, secured to one side of the test pool. A wheeled carriage is movably secured to the rail. One end of a line or cable is affixed to the end of the carriage opposite the end facing the bottom of the test pool. The opposite end of the cable rides over a direction changing pulley or wheel and is affixed to a take-up wheel or drum attached to a bi-directional gear motor so that the vertical travel of the line is converted to horizontal travel. A position indicating device is slaved to the cable to show the cable position at any point in time. The bi-directional gear motor is connected via a cable to a motor controller physically located in an instrumentation building which also is connected to the SSS array under test via an array cable. The present invention thus performs controlled linear translation of the array rather than the more typically used rotation of the prior art. Accurate beam pattern measurements are achieved as a result of the invention making possible slow accurate translational movement. Slow translational speeds achievable by the present invention results in finer samples in the beam pattern. Finally, the present invention permits the array to move and the source point to remain stationary or vide versa without any affect on the beam pattern being measures.

Other objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

DETAILED DESCRIPTION

Figure 1:
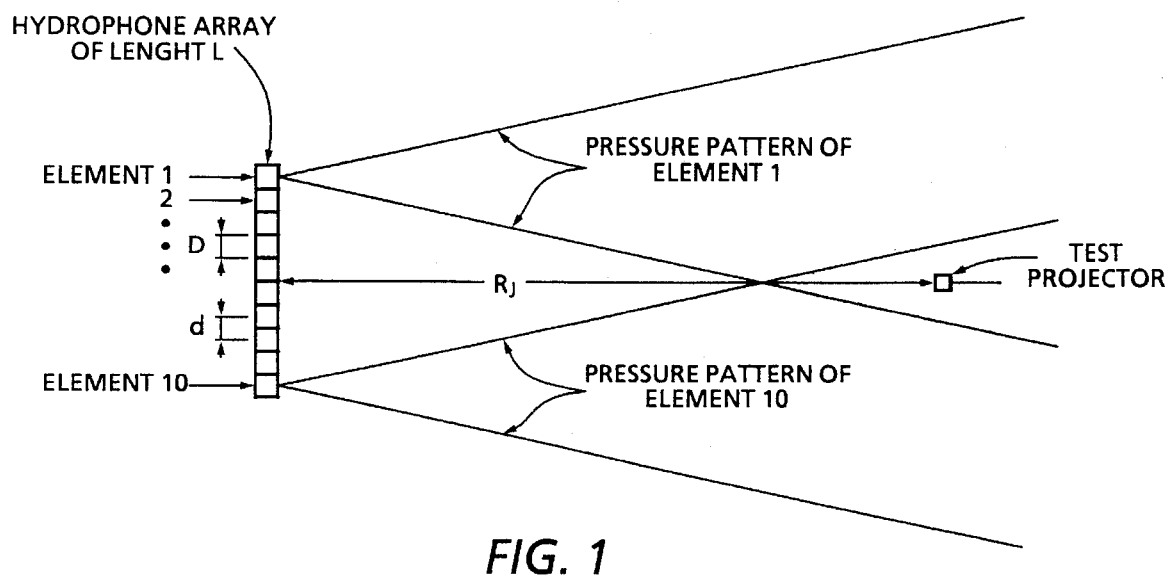
FIG. 1 is a top view of an SSS array for measuring and calibration geometry.
Figure 2:
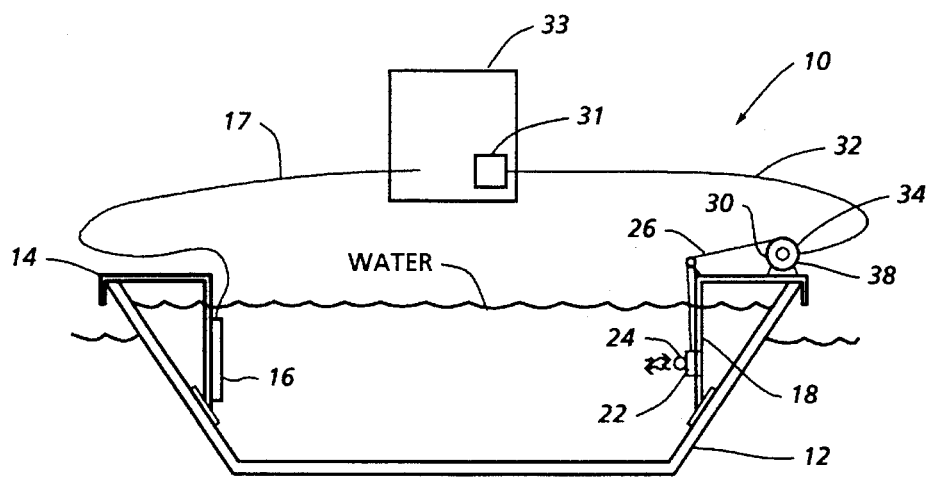
FIG. 2 is a side view of the present invention for measuring side-scanning sonar projector array beam patterns.
Figure 3:
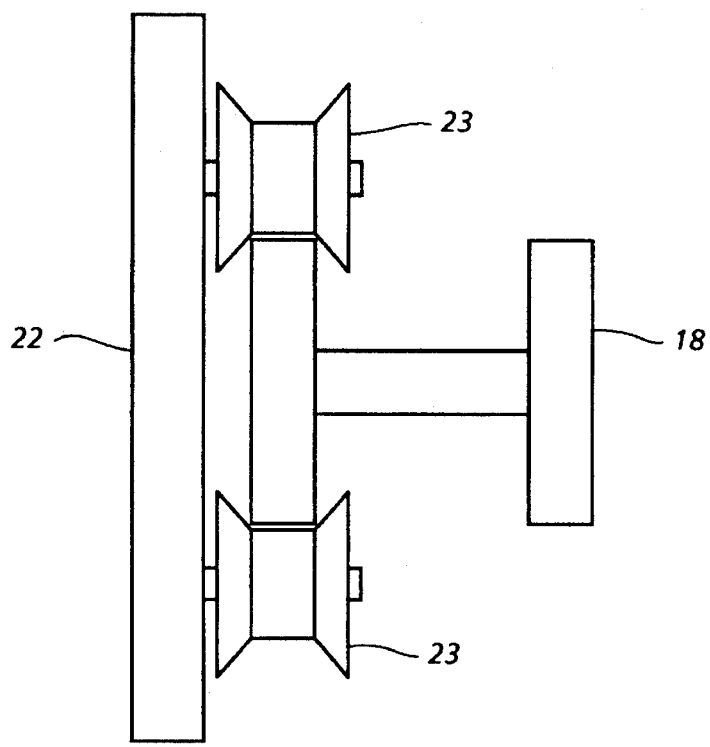
FIG. 3 is a top view of the transducer carriage and the vertical rail of the present invention.

With reference to FIG. 2, the present invention, the beam pattern measuring apparatus 10 for side scanning sonars (SSS) is comprised of the fixed mounting means 14 mounted securely to one end of the test pool 12 and a vertically mounted guide 18 secured to the opposite end of the pool so that the guide 18 and the fixed mounting means are disposed orthogonally with respect to each other. In FIG. 2, the SSS array 16 is shown mounted to the fixed mounting means 14 and is connected by the array cable 17 to the instrumentation building 33 for signal reception purposes. The carriage 22 is movably attached to the vertically mounted guide 18 at the opposite end of the pool 12 from the array 16. The transducer 24 is affixed to the side of the carriage 22 facing the array 16. FIG. 3 shows the details of the carriage 22, in this case, employing idler wheels 23 to movably cooperate with the vertically mounted guide 18, here an I-shaped beam, for one embodiment of the present invention. Fixed slides attached to the carriage and engaging the I-shaped beam 18 or a slotted rail is another of many variations of movable engagements between the vertically mounted guide 18 and the carriage 22 that may be employed in the present invention to produce the accurate vertical movement and positioning required.

The carriage 22 is connected to one end of the cable 26 which travels over the pulley 28 for direction changing from the vertical to the horizontal and then to the takeup reel 34 rotatably secured to the gear motor 30. The gear motor 30 is connected via the motor controller and position cable 32 to the motor controller 31 located in the instrumentation building 33, shown in FIG. 2, or equivalent control site. The position indicator 38 is shown in FIG. 2 located on the takeup reel 34 on the motor 30. In one embodiment the indicator 38 is a multi-turn potentiometer slaved to the cable 26 in order to report the exact position of the carriage 22 on the vertically mounted guide 18.

It should be noted that in the operation of the present invention, the source point, a small calibrated projector 24 for measuring receiver patterns or a small calibrated reflector for two-way composite patterns, is much smaller and easier to move than the SSS array, which can be several meters long. Thus, the invention contemplates moving the source past the fixed-position array as one contribution to accuracy of beam pattern measurement. The vertical orientation used in the present invention eliminates the sag inherent to horizontal measurement configuration to further enhance measurement accuracy. The projector 24 is connected to the instrumentation building via an electrical cable, not shown for clarity.

Figure 4:
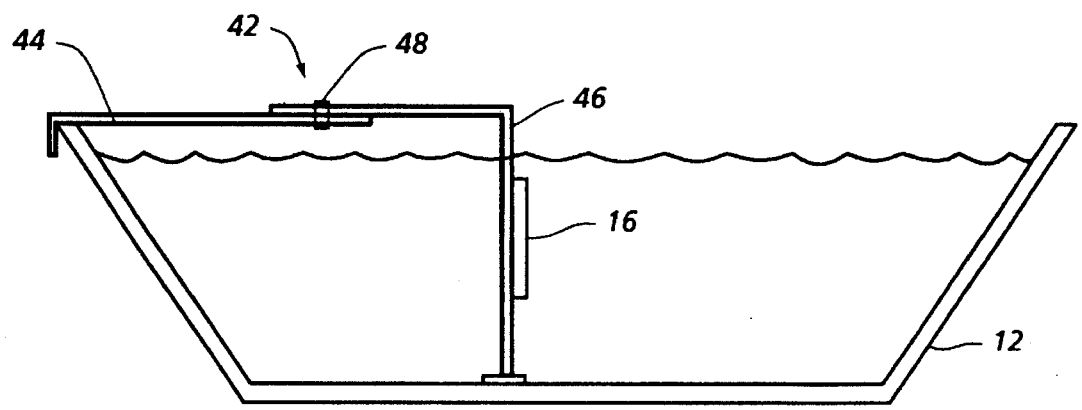
FIG. 4 is a side view of an alternate configuration of the present invention permitting range adjustment.

FIG. 4 depicts an alternate test array 16 mounting means. The fixed mounting means 14 in FIG. 2 is in FIG. 4 the two piece adjustable array support 42 consisting of the fixed arm 44, the movable vertical support 46, and the clamp 48. The clamp 48 is used for locking the movable vertical support 46 to the fixed arm 44 after the arm 44 is moved in the horizontal direction relative to the vertically mounted guide 18 at the opposite end of the test pool 12 shown in FIG. 2 for range adjustments. This adjustable range configuration of the present invention can be motorized and may include precision adjustment features for particular applications.

The structures and methods disclosed herein illustrate the principles of the present invention. The invention may be embodied in other specific forms without departing from its spirit or essential characteristics. The embodiment of the invention described herein is to be considered in all respects as exemplary and illustrative rather than restrictive. Therefore, the appended claims rather than the foregoing description define the scope of the invention. All modifications to the embodiment described herein that come within the meaning and range of equivalence of the claims is embraced within the scope of the invention.

What I now claim as my invention is:

1. An apparatus for measuring side-scanning sonar beam pattern in a test pool having a bottom and two opposite end walls extending upward from and normal to said bottom and spaced apart orthogonally from and in parallel with each other, said apparatus comprising:

a mounting means for securing a sonar array upon one end wall of said pool, said means positioned upon said end-wall in the vertical direction normal to the bottom of said pool;

a straight, elongated, and rigid guide means attached to the opposite end-wall of said test pool, said means positioned upon said end-wall in the vertical direction normal to the bottom of said pool;

a means for carrying an affixed test transducer and traveling up and down said guide means;

a connecting means extending between a takeup reel on a gear motor and said carrying means, said connecting means attached to said reel and said carrying means to move said carrying means upon said guide means;

a means slaved to said connecting means for indicating the position of said carrying means, and a motor control means connecting to said gear motor for controlling the direction of movement and speed of said connecting means and the position and velocity of said carrying means attached to said connecting means.

2. The apparatus of claim 1 wherein said guide means is an I-beam-shaped rail.

3. The apparatus of claim 1 wherein said guide means is a beam having a longitudinally oriented slot in one surface thereof and extending along and for the length of said beam.

4. The apparatus of claim 2 wherein said carrying means is a carriage having a longitudinal axis and having one axle affixed laterally and normal to said axis, said axle having a wheel on opposite ends thereof and disposed to engage said I-beam rail so that said carriage may be moved along said rail having its lateral position restricted as it is moved vertically along said rail.

5. The apparatus of claim 3 wherein said carrying means is a carriage having a slide affixed to one side of said carriage, said slide shaped to engage said slot and to thereby restrict any lateral movement of said carriage as said carriage travels along said slot.

6. The apparatus of claim 1 wherein said indicating means is a multi-turn potentiometer attached to said string so that the position of said carrying means attached to said string is indicated as a function of the position of said string provided by the output of said potentiometer.

7. The apparatus of claim 1 wherein said connecting means is selected from the group consisting of a rope, a metal cable, and a sprocket-type-chain.

8. The apparatus of claim 1 wherein said mounting means is fixed.

9. The apparatus of claim 1 wherein said mounting means is adjustable for positioning the attached sonar array the horizontally from said guide means to adjust range.

10. An apparatus for measuring side-scanning sonar beam pattern in a test pool having a bottom and two opposite end walls extending upward from and normal to said bottom and spaced apart orthogonally from and in parallel with each other, said apparatus comprising:

a rigid and fixed mounting means for securing a sonar array upon one end wall of said pool, said mounting means affixed to said end wall parallel thereto and in the vertical direction normal to the bottom of said pool;

a rigid and elongated rail attached to the opposite end wall of said test pool, said rail positioned on said end wall in the vertical direction normal to the bottom of said pool;

a carriage for transporting an affixed test transducer, said carriage captively connected to said rail to permit movement up and down thereon;

a cable extending between a takeup reel on a gear motor and said carriage, on end of said cable attached to said reel and the opposite end connected to said carriage to move said carriage upon said rail;

a potentiometer slaved to said cable for indicating the position of said carriage upon said rail; and a gear motor controller connected to said gear motor for controlling the direction of movement and speed of said cable, and the position and velocity of said carriage attached to said cable.

* * * * *